United States Patent
Gomez Ramirez et al.

(10) Patent No.: US 7,581,861 B2
(45) Date of Patent: Sep. 1, 2009

(54) DEVICE FOR CLOSING OFF THE OPENING IN A LIGHTING DEVICE HOUSING FOR A MOTOR VEHICLE

(75) Inventors: Manuel Gomez Ramirez, Bobigny (FR); Rafael Vazquez Quesada, Bobigny (FR)

(73) Assignee: Valeo Vision, Cedex, Bobigny (FR)

( * ) Notice: Subject to any disclaimer, the term of this patent is extended or adjusted under 35 U.S.C. 154(b) by 512 days.

(21) Appl. No.: 11/387,135

(22) Filed: Mar. 21, 2006

(65) Prior Publication Data
US 2006/0213787 A1 Sep. 28, 2006

(30) Foreign Application Priority Data
Mar. 22, 2005 (FR) .................... 05 02846

(51) Int. Cl.
*F21V 7/04* (2006.01)
(52) U.S. Cl. .................. 362/549; 362/507; 362/540; 362/541; 362/546
(58) Field of Classification Search ........................ None
See application file for complete search history.

(56) References Cited

U.S. PATENT DOCUMENTS

| | | | | |
|---|---|---|---|---|
| 581,293 | A * | 4/1897 | Leggett | 220/254.9 |
| 1,381,161 | A * | 6/1921 | Besch | 362/282 |
| 1,696,456 | A * | 12/1928 | Sebring | 220/215 |
| 2,160,436 | A * | 5/1939 | Jones | 43/55 |
| 2,388,787 | A * | 11/1945 | Kuschel et al. | 362/512 |
| 3,739,319 | A | 6/1973 | Garnett | |
| 3,949,899 | A * | 4/1976 | Jacobs et al. | 220/345.3 |
| 5,056,817 | A * | 10/1991 | Fuller | 280/770 |
| 5,107,405 | A * | 4/1992 | Makita | 362/467 |
| 5,113,330 | A * | 5/1992 | Makita | 362/265 |
| 5,651,604 | A * | 7/1997 | Dobler et al. | 362/507 |
| 5,735,596 | A * | 4/1998 | Daumueller | 362/267 |
| 6,439,442 | B1 * | 8/2002 | Markert et al. | 222/547 |
| 6,547,427 | B1 * | 4/2003 | Cheron et al. | 362/507 |

FOREIGN PATENT DOCUMENTS

| | | | |
|---|---|---|---|
| DE | 2813035 | A * | 10/1978 |
| DE | 3325597 | A1 * | 1/1985 |
| EP | 0 649 773 | | 4/1995 |

(Continued)

OTHER PUBLICATIONS

Search Report corresponding to FR 05 02 856.

(Continued)

*Primary Examiner*—Sandra L O'Shea
*Assistant Examiner*—Danielle Allen
(74) *Attorney, Agent, or Firm*—Locke Lord Bissell & Liddell

(57) ABSTRACT

The object of the invention is a closure device able to be mounted on an opening in the housing of a lighting/signalling device for a motor vehicle of the headlight type. This device comprises a rigid cover on which a movable flap is able to slide over a given travel between an open position and a closed position. The movable flap being provided with mechanical locking means cooperating when it is in the closed position with complementary means present on the housing on or close to the periphery of the opening in order to ensure the locking of the cover in abutment against the housing.

14 Claims, 3 Drawing Sheets

FOREIGN PATENT DOCUMENTS

| | | |
|---|---|---|
| FR | 2 092 297 | 1/1972 |
| FR | 2583500 A1 * | 12/1986 |
| FR | 2642023 A1 * | 7/1990 |
| FR | 2 697 318 | 4/1994 |
| FR | 2 821 329 | 8/2002 |

OTHER PUBLICATIONS

Dialog English Abstract for FR 2 697 318.
Dialog English Abstract for FR 2 821 329.
Dialog English Abstract for EP 0 649 773.

* cited by examiner

DEVICE FOR CLOSING OFF THE OPENING IN A LIGHTING DEVICE HOUSING FOR A MOTOR VEHICLE

FIELD OF THE INVENTION

The invention relates to a lighting and/or signalling device for a motor vehicle, of the headlight type. For reasons of conciseness, the term headlight will be used in the remainder of this text, but this term must be understood in the broad sense.

BACKGROUND OF THE INVENTION

The invention concerns more particularly the method of closing off openings made in headlight housings. This is because a headlight usually comprises a housing closed at the front by an outer lens, and which encloses at least one lamp generally associated with a reflector. In order to have access to the inside of the headlight, in particular in order to have access to the lamp and thus be able to change it, one or more openings are provided at the rear of the housing. In order to close off these openings, covers or caps are provided, generally made from polymer material, which must meet a certain number of criteria: they must at least make it possible to ensure the water tightness of the housing once mounted. They must preferably be easy to use, that is to say easy to mount and remove. It is preferable for them to procure for the user ease in use, in particular for it to enable the operator to check easily that he has properly positioned/closed the cover or cap in a watertight fashion.

Several systems exist: from the patent EP 643 256, a closure hood is known, made from semi-rigid polymer material comprising an annular skirt able to adapt to a radial projecting protrusion disposed on the periphery of the opening in the housing. Caps made from rigid polymer material are also known, which are positioned on the periphery of the opening and then locked in position by virtue of curved metal rods mounted on the housing so as to be able to pivot on an axis and thus lock the cap against the opening, the rods being intended to be locked in grooves formed on the housing. However, these systems are not without drawbacks. In the first case, the semi-rigid caps may not be sufficient to pass the most demanding specifications, in particular if the opening is relatively large. In the second case, the use of metal rods requires a certain degree of movement at the rear of the opening, to enable them to pivot, whilst the space between the rear of the housing and the bodywork is often small. And the operation of mounting/removing the cap could be easier and more comfortable: the operator must exert a force in order to lock/unlock the rods, and the risk exists that he may nip his fingers.

The aim of the invention is then to develop a novel system of closing off the openings in headlight housings which is better. Secondarily, an aim of the invention is that this novel system be in particular easier to use and/or more secure and/or able to be used even when accessibility to the openings of the rear of the headlight once mounted in the vehicle is small.

SUMMARY OF THE INVENTION

The object of the invention is then a closure device able to be mounted on an opening in the housing of a lighting/signalling device for a motor vehicle of the headlight type. This device comprises a rigid cover on which a movable flap is able to slide on a given travel between an open position and a closed position, the movable flap being provided with mechanical locking means cooperating, when it is in the closed position, with complementary means present on the housing on or close to the periphery of the said opening in order to ensure the locking of the cover in abutment against the housing.

The main advantage of such a system is its ease of being mounted on/removed from the housing, and its ergonomic nature: in the previous system mentioned above, it was necessary to make the metallic rods pivot so that they hold the cover forcibly against the housing. With the invention, the operator does not need to make any effort, it suffices for him to make one part, the movable flap, slide against another, the rigid cover. In addition, this sliding, this translation, preferably takes place in a plane substantially parallel to the plane passing through the opening in the housing to be closed off, which means that it is no longer necessary to have a significant amount of movement at the rear of the headlight, when it is mounted on the vehicle, in order to easily mount/remove the cover/flap assembly.

Advantageously, the sliding of the movable flap is a translation movement, in particular in a plane parallel to the plane of the opening in the housing.

Preferably, the means of mechanical locking of the movable flap comprise at least one lug able to cooperate with at least one stop present close to or on the periphery of the opening in the housing, preferably with one or two pairs of lugs on the flap cooperating with one or two pairs of stops on the housing. Recourse is thus had to a system of the clipping type, which provides great ease of use: the operator, at the time of mounting in particular, easily realizes whether or not he has correctly locked the flap, if he has sufficiently slid the movable flap.

The movable flap preferably has a gripping handle, facilitating the sliding of the movable flap with respect to the rigid cover.

Advantageously, the rigid cover is provided, on its external face, on at least one of its sides, with guidance means cooperating with complementary guidance means disposed on one side of the movable flap, so as to guide the sliding on the flap on the cover. It is a question in particular of grooves with complementary shapes such that the only movement possible for the flap with respect to the cover is a translation movement along a given axis.

Advantageously, the travel of the movable flap with respect to the rigid cover is delimited in its movement by at least one element projecting at the edge of the external face of the rigid cover, an element disposed in at least one opening formed on a corresponding edge of the movable flap. The movement of the flap with respect to the cover is thus perfectly defined/controlled. Preferably two cooperating elements are provided.

According to one embodiment of the invention, the movable flap has a substantially flat bottom and two lateral flanks in radial projection with respect to said bottom and disposed along two of the opposite sides of the said bottom, guidance means disposed between the bottom and at least one of the lateral flanks of the said flap, of the groove type, allowing sliding on complementary guidance means on the rigid cover. Preferably, the cover also has a shape comprising a substantially flat bottom, so that the bottom of the flap can match the shape of the bottom of the cover against which it is disposed.

Advantageously, the end of the lateral flanks of the movable flap has a projection able to cooperate with projecting arrangements on or close to the periphery of the opening in the housing in order to press the movable flap against the housing. This is provided in order to prevent the flap, and therefore the cover fixed to it, lifting up with respect to the walls of the housing close to the opening, once the cover is positioned on the opening in the housing.

Preferably, the rigid cover is provided on its internal face with a skirt delimiting a groove at the bottom of which there is disposed a compressible seal, in particular insert-moulded or simply positioned. The mounting of the cover and flap is thus designed so that the cover is positioned on the housing, the flap being in the open position, so that the groove cooperates with a radial projecting arrangement provided on the housing. Next the movable flap is made to slide with respect to the cover, so as to clip the lugs on the movable flap on stops provided on the housing, this sliding operation exerting an abutment force on the cover against the housing, resulting in a compression of the seal such that, once the flap has come into the closed position, the seal is sufficiently compressed to ensure the water tightness of the housing at the skirt of the cover, and therefore at the housing/cover interface.

The invention also concerns an housing for a lighting/signalling device for a motor vehicle of the headlight type and comprising at least one access opening closed by a closure device as described above.

The housing according to the invention can be designed in the following fashion:
- the periphery of the opening in the housing and the movable flap are provided with complementary arrangements for guiding the flap on the housing, of the axially projecting rib type cooperating with a projection on the flank of the movable flap,
- the periphery of the opening in the housing and the movable flap are provided with complementary arrangements for mechanically locking the flap on the housing, of the type with snapping of lugs in stops,
- the periphery of the opening in the housing and the rigid cover are provided with complementary arrangements ensuring the watertight holding of the cover against the housing, of the type consisting of a radially projecting rib on the housing cooperating with a skirt defining a groove provided with a seal on the cover,
- the rigid cover and the movable flap are provided with complementary means allowing the sliding of the flap against a cover, of the type consisting of a system of complementary guidance ribs on at least one of their respective sides.

The invention also concerns the headlight as a whole containing such a housing, and any motor vehicle on which such a headlight is mounted.

BRIEF DESCRIPTION OF THE DRAWINGS

The invention will be detailed below with the help of a non-limiting example illustrated by the following figures.

DESCRIPTION OF THE PREFERRED EMBODIMENTS

All these figures are schematic and are not necessarily to scale between each of the components depicted, for more clarity.

Figure 1:
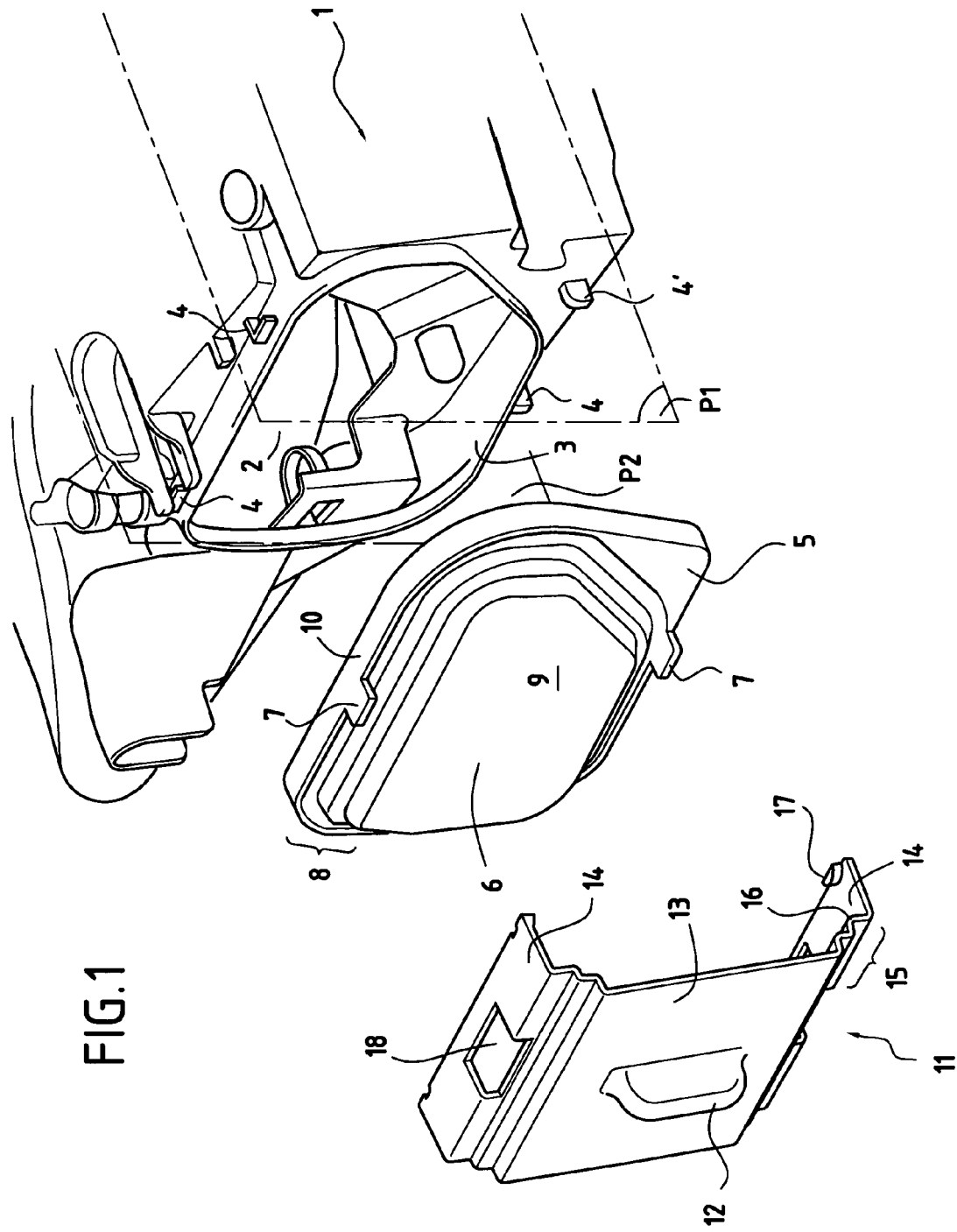
FIG. 1 is an exploded view of a headlight housing portion provided with an opening and the closure system according to the invention with movable flap and rigid cover.

FIG. 1 is therefore an exploded view of a portion of the housing of a motor vehicle headlight associated with the closure system according to the invention. The housing 1 has an access opening 2 with a surface area of approximately 20 to 30 cm$^2$. This opening provides access to a lamp (not shown) inside the housing. The shape of this opening is essentially rectangular with rounded corners, with one of the sides having a bevel. However, it can take all other shapes, square, round or oval for example, according to the configuration of the headlight. This opening has on its periphery an arrangement in the form of a protrusion, a projection 3 extending radially with respect to the wall of the housing 1. This protrusion is for example around 2 to 10 mm, and is continuous. Along the two longest sides of the opening, this protrusion 3 comprises, on its external flanks ("external" should be understood here as meaning that it is a case of the side that is not turned towards the opening), three stops 4. A fourth stop 4' is disposed close to the protrusion 3 but not directly disposed on the protrusion. They are in opposite pairs. There are thus two stops at the top and two stops at the bottom ("top" and "bottom" should be understood in the light of FIG. 1, which depicts the housing in its position of use once mounted in the bodywork of the vehicle).

FIG. 1 also depicts the rigid cover 5: it is a piece made from polymer material, for example polycarbonate or polybutylene terephthalate. Its external face 6 (that is not turned towards the opening 2 once mounted on the housing 1) the only one visible in the figure, has two projecting elements 7, and a set of grooves 8 which substantially follow the shape of the periphery of the opening 2. The cover 5 has a substantially flat bottom 9, which is extended by a flange 10 continuous all around the bottom 9.

Finally, FIG. 1 depicts the movable flap 11. This is a symmetrical part, which advantageously makes it possible to keep the same flap whether it is a case of making a right-hand headlight or a left-hand headlight. It is also made from polymer material, and relatively rigid. Its external face (this term being employed with the same conventions as mentioned above) has a gripping handle 12. Its general form comprises a bottom 13, also substantially flat, defining a rectangular surface, which is extended in two flanks/rims 14 on two of its largest opposite sides. These flanks 14 are oriented substantially perpendicular to the plane of the bottom 13 and are connected to the said bottom 13 by stepped (or inclined) intermediate areas 15 and provided with a system of grooves 16. Moreover, on the internal face of the flap 11, there are disposed symmetrically two clips/lugs 17 on each of the flanks 14. On one of those flanks 14 of the movable flap, a substantially rectangular opening 18 is provided. Another identical opening is disposed on the opposite flank. These openings cooperate with the projecting elements 7 on cover 5.

Figure 4:
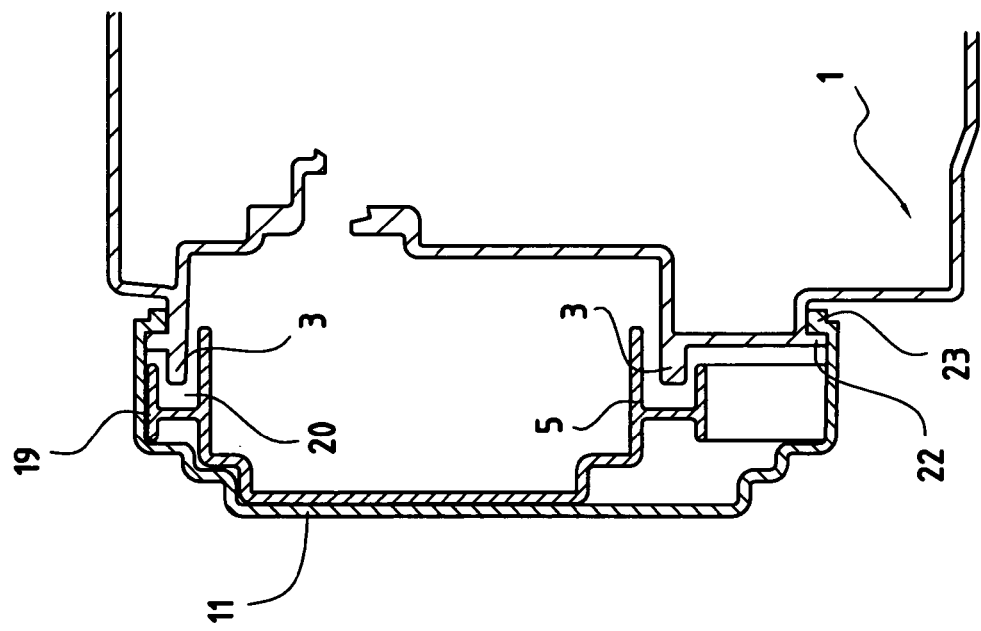
FIG. 4 is a section view along the plane P1 depicted in FIG. 1 of the closure system, according to the invention.
Figure 3:
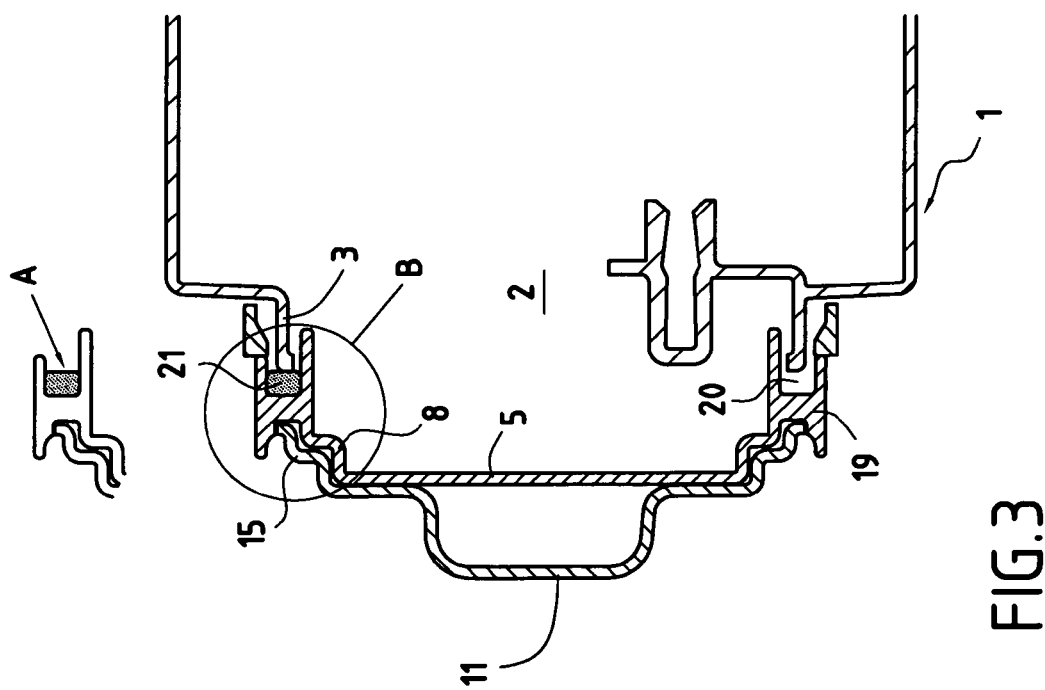
FIG. 3 is a section view along the plane P2 depicted in FIG. 1 of the closure system, with the flap in the closed position.

This figure thus explains the way in which certain complementary arrangements interact between housing, cover and flap. The cover 5 is intended to close off the opening 2, the movable flap is intended to be mounted fixed on the cover so as to slide on the cover:

the stops 4 disposed on the housing are intended to cooperate with the lugs 17 on the movable flap, so as to lock the flap in position against the housing, the grooves 16 on the movable flap 11 are intended to cooperate with the grooves 8 on the rigid cover 5, so that the sliding of the movable flap against the rigid cover is guided, the protrusion 3 around the opening 2 is intended to be disposed in a peripheral groove 20 disposed on the edge of the cover 5, depicted in FIG. 3 and in FIG. 4, the two projecting elements 7 on the rigid cover are intended to be inserted in the two openings 18 on the movable flap once the flap 11 is associated with a cover 5.

Figure 2A:
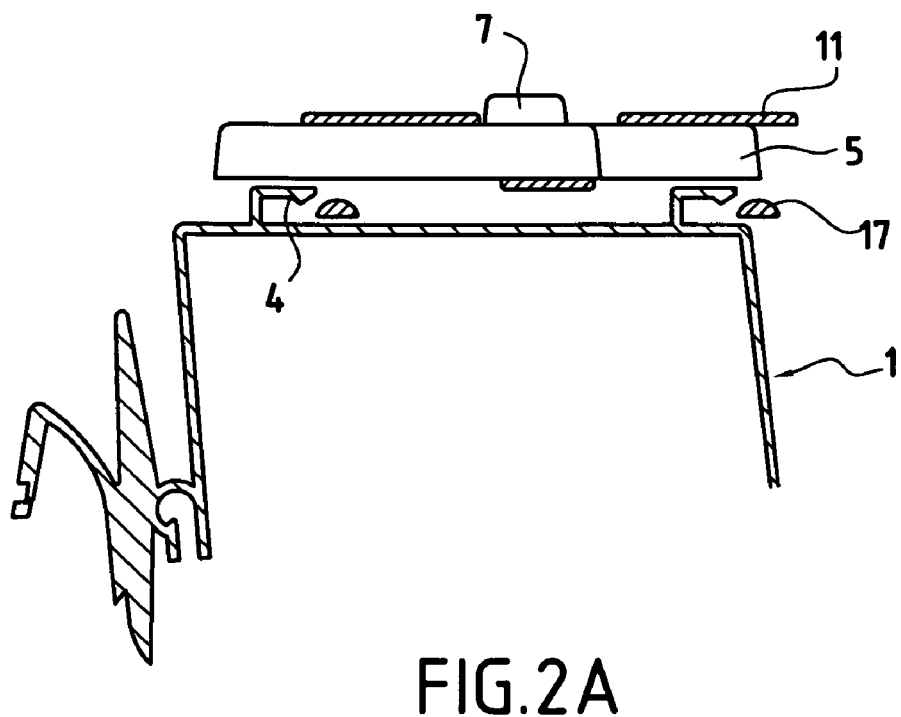
FIGS. 2a and 2b show a plan view of the closure system according to the invention with the movable flap in the open position (FIG. 2a) and in the closed position (FIG. 2b)
Figure 2B:
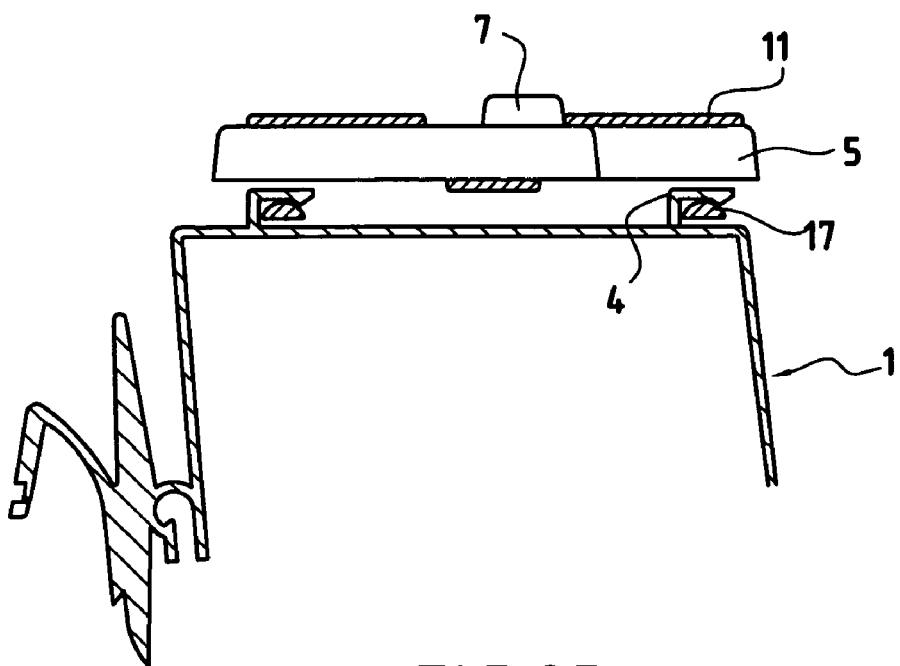

The following description as illustrated in FIGS. 2*a* and 2*b* gives a better understanding how the mounting/removal of the flap/cover system operates:

FIGS. 2*a* and 2*b* depict a simplified plan view of the housing in FIG. 1, once the closure system 5, 11 is placed on the opening 2. FIG. 2*a* shows the first step of the mounting of a flap/cover system: the opening 2 with the cover 5 fitting on it can be seen therein, with the movable flap 11 against the cover 5 in its "open" position. The lugs 17 on the flap are not yet in the stops 4.

FIG. 2*b* shows the flap in the closed position, the lugs 17 are snapped against the stops 4, 4', effecting the mechanical locking of the flap against the housing, causing the locking of the cover, mounted fixed with the flap, against the housing.

The length of travel of the flap 11 with respect to the cover 5 is defined by the relative sizing between the opening 18 in the movable flap with respect to the projecting element 7 on the cover 5.

FIGS. 3 and 4 are simplified views of sections of the housing in the area of an access opening 2, respectively along the planes P2 and P1 depicted in FIG. 1. FIG. 3 displays the way in which the rigid cover 5 fits on the housing 1, it shows the flap 11 in the closed position. There is shown therein the skirt 19 present on the flange of the cover 5, which defines a groove 20 in which a seal 21 is disposed, which is made from compressible polymer material of the EPDM type. The projection 3, radially oriented with respect to the rear wall of the housing, is present on the periphery of the opening 2, so as to be inserted in the groove 20 on the cover 5. As long as the flap is in the open position, the seal is not compressed, as depicted in detail A. When the flap is translated towards its closed position (detail B) and snapping-on is effected between lugs and stops, the seal is compressed: it is in this compressed state that it correctly provides the water tightness of the housing at the cover.

FIG. 4 illustrates the way in which the movable flap, once the cover is positioned in the opening 2, can no longer be lifted: it is seen that the section of the opening locally has a protrusion 22 extending axially with respect to the wall of the housing, which cooperates with the shape having a projection 23 on the flank of the movable flap 11. There is thus also a guidance of the flap with respect to the housing when it slides with respect to the movable cover. No force exerted perpendicular to the plane of the opening 2 of the housing can result in the flap 11 and cover 5 escaping from the opening, once the movable flap is in the closed position.

The closure system according to the invention is therefore practical to mount/remove, requiring no physical force, and reassures the user since a true positive mechanical locking of the system against the housing is achieved. Water tightness is guaranteed.

In addition, the closure system according to the invention can easily be adapted to very different geometries and dimensions of opening 2, in particular since it is possible keep for the movable flap I opposite flanks parallel to each other 14 provided with locking means cooperating with complementary means provided on the housing close to and/or on the periphery of the opening whatever the shape of the opening.

What is claimed is:

1. A closure device removably coupled to a housing of a lighting device for a motor vehicle, the device comprising:
   (a) a cover that closes an opening in the housing; and
   (b) a movable flap that is slidable on an external face of the cover between an open position and a closed position, the movable flap having a locking device cooperating, when the movable flap is in the closed position, with a complementary device on the housing on or close to the periphery of the opening to lock the cover in abutment against the housing.

2. The closure device according to claim 1, wherein the sliding of the movable flap between the open position and the closed position is a translation movement along a plane parallel to the plane of the opening in the housing.

3. The closure device according to claim 1, wherein the locking device of the movable flap comprises at least one lug and the complementary device on the housing comprises at least one stop present close to or on the periphery of the opening in the housing.

4. The closure device according to claim 1, wherein the movable flap has a gripping handle to facilitate the sliding of the movable flap with respect to the cover.

5. The closure device according to claim 1, wherein at least one side of an external face of the cover is provided with a guidance device cooperating with a complementary guidance device disposed on at least one side of the movable flap, so as to guide the sliding of the flap on the cover.

6. The closure device according to claim 1, wherein the travel of the movable flap with respect to the cover is delimited in its movement by at least one projecting element at the edge of the external face of the cover, the at least one projecting element being disposed in at least one opening formed on a corresponding edge of the movable flap.

7. The closure device according to claim 1, wherein the movable flap has a substantially flat bottom and two lateral flanks projecting radially with respect to the bottom and disposed along two of the opposite sides of the bottom, and a guidance device of the movable flap being a groove disposed between the bottom and at least one of the lateral flanks of the flap allowing sliding on a complementary guidance device on the cover.

8. The closure device according to claim 7, wherein the end of the lateral flanks of the movable flap has a protrusion able to cooperate with projecting arrangements disposed on or close to the periphery of the opening in the housing in order to press the movable flap against the housing.

9. The closure device according to claim 1, wherein the cover is provided on its periphery with a skirt delimiting a groove at the bottom of which there is disposed a compressible seal.

10. A housing for a lighting device for a motor vehicle of the headlight type, comprising at least one opening closed by a closure device according to claim 1.

11. A housing for a motor vehicle headlight device comprising at least one opening provided with a removable closure device, wherein the closure device comprises a cover that closes said opening and a movable flap that is slidable on an external face of the cover between an open position and a closed position, the movable flap being provided with a locking device cooperating, when the movable flap is in the closed position, with a complementary device present on the housing on or close to the periphery of the opening in order to lock the cover in abutment against the housing.

12. The housing according to claim 11, wherein:
(a) the periphery of the opening in the housing is provided with an axially projecting rib that engages a protrusion on a flank on the movable flap to guide the movable flap on the housing;
(b) the periphery of the opening in the housing is provided with stops that engage lugs formed on the movable flap to lock the flap on the housing;
(c) the periphery of the opening of the housing is provided with a radially projecting rib that engages a groove defined by a skirt formed in the cover, wherein the groove includes a seal which provides a watertight connection between the housing and the cover; and
(d) the cover is provided with at least one guide rib which engage with at least one complementary guide rib formed on the movable flap allowing the sliding of the flap against the cover.

13. A lighting device for a motor vehicle of the headlight type, comprising a housing according to claim 10.

14. A motor vehicle comprising at least one lighting device according to claim 1.

* * * * *